(12) United States Patent
Roussy

(10) Patent No.: US 6,817,316 B1
(45) Date of Patent: Nov. 16, 2004

(54) HATCHLING TRANSPORT TRAILER

(76) Inventor: Lucien Joseph Roussy, R.R. #3, Clifford, Ontario (CA), N0G 1M0

( * ) Notice: Subject to any disclaimer, the term of this patent is extended or adjusted under 35 U.S.C. 154(b) by 0 days.

(21) Appl. No.: 10/725,404

(22) Filed: Dec. 3, 2003

(51) Int. Cl.[7] .................................................. B60P 3/04
(52) U.S. Cl. ...................................................... 119/401
(58) Field of Search ................................ 119/400–402; 454/83, 92; D12/102

(56) References Cited

U.S. PATENT DOCUMENTS

| | | | |
|---|---|---|---|
| 1,520,504 A | | 12/1924 | Mudd |
| 1,577,639 A | | 3/1926 | Holloway |
| 1,744,873 A | * | 1/1930 | Edgerton ..................... 119/402 |
| 2,087,790 A | * | 7/1937 | Anderson .................... 454/83 |
| 3,092,007 A | * | 6/1963 | Boyd .......................... 454/92 |
| 4,454,837 A | | 6/1984 | Luebke |
| 4,481,870 A | | 11/1984 | Smith |
| 4,633,767 A | * | 1/1987 | Sain ............................ 454/92 |
| 6,581,544 B1 | | 6/2003 | Smith |

FOREIGN PATENT DOCUMENTS

| | | | | |
|---|---|---|---|---|
| DE | 3724067 A1 | * | 2/1989 | ............ B60H/1/24 |
| SU | 1523427 A1 | | 11/1989 | |

* cited by examiner

*Primary Examiner*—Michael J. Carone
*Assistant Examiner*—Bret Hayes
(74) *Attorney, Agent, or Firm*—Anissimoff & Associates; Robert A. H. Brunet; Hans Koenig

(57) ABSTRACT

A trailer for transporting live poultry hatchlings has a cargo space for containing a plurality of perforated hatching containers. The hatching containers are stacked to create a central passage for air flow along the length of the trailer from which the air is admitted into a side duct on each side of the trailer through apertures in each side wall of the cargo space. This creates a transverse flow of air through the hatchling containers. A variety of measures may be undertaken alone or in combination to promote a similar transverse flow of air at all positions along the length of the trailer. The size of the apertures, spacing between apertures, cross-sectional area of the side ducts, cross-sectional area of the cargo space, or a combination thereof, may be varied along the length of the trailer to promote a similar transverse flow of air at all positions along the length of the trailer. The air collected within the side ducts may be exhausted and/or at least a portion thereof may be recycled in order to maintain life sustaining environmental conditions within the trailer.

20 Claims, 8 Drawing Sheets

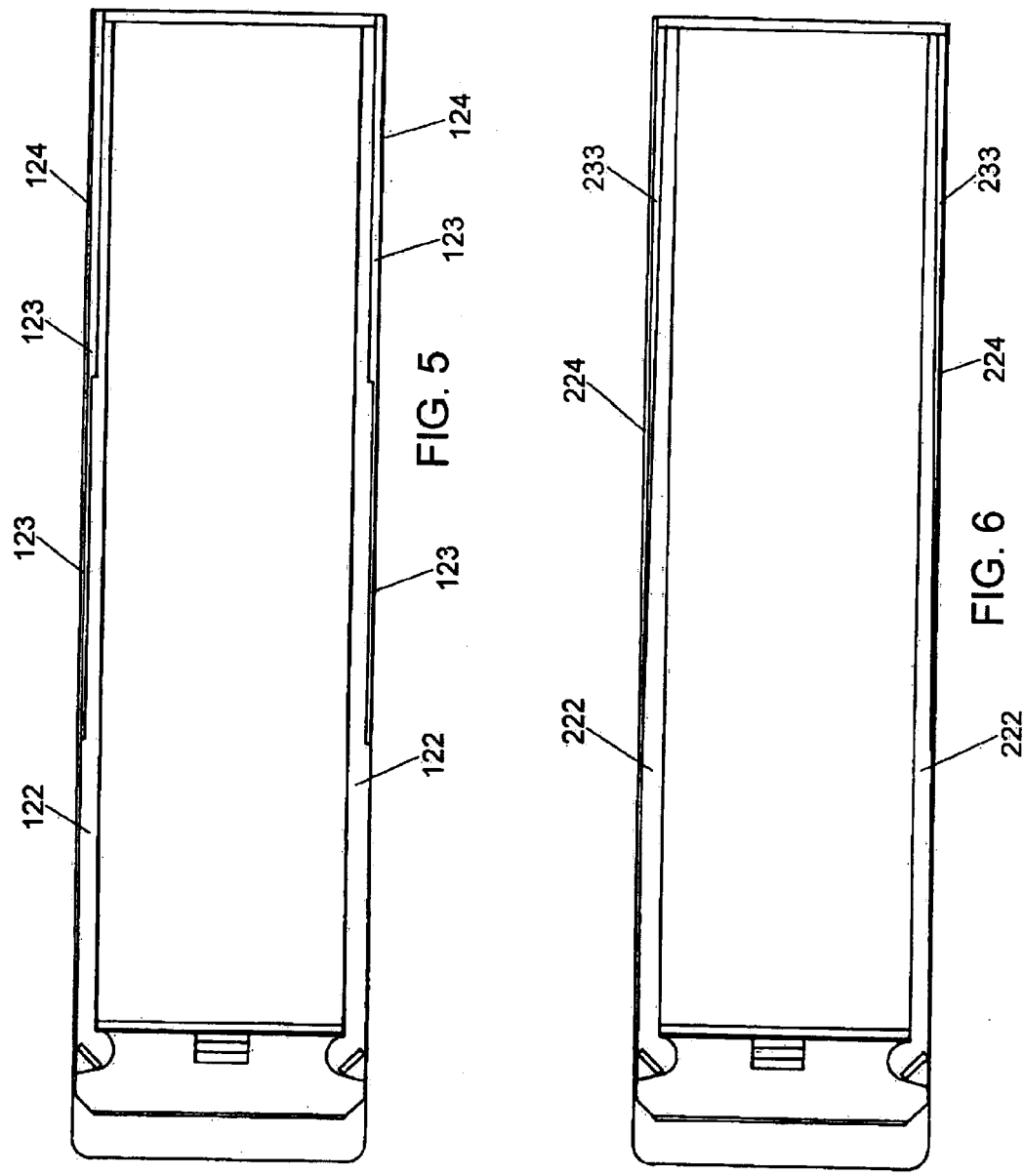

US 6,817,316 B1

HATCHLING TRANSPORT TRAILER

FIELD OF THE INVENTION

The invention relates to trailers for the transport of live poultry hatchlings, for example chicken or turkey chicks. More particularly, the invention relates to a high capacity trailer for transporting live poultry hatchlings with a transverse flow of air therethrough that is similar at all positions along the length of the trailer.

BACKGROUND

In poultry husbandry, hatchlings are transported from hatcheries to barns where the hatchlings are raised to adulthood. The hatchlings are first placed in containers that are typically rectangular with a height approximately equal to the height of a hatchling and are sized to accommodate a plurality of hatchlings in each container. The containers are normally stacked on top of one another and are perforated on all four sides to allow the passage of air through the container. The containers are then loaded on to vehicles for transport.

Each vehicle has a cargo space that is ventilated in order to maintain controlled environmental conditions. The cargo space has a flow of air therethrough that includes a certain amount of fresh air and that may be conditioned to a desired temperature and/or humidity. The flow of air is directed through the hatchling containers to ensure that life-sustaining conditions are maintained therein.

In the past, the vehicles have primarily been trucks having an extended frame with a cargo body attached thereto. One such truck, designed and sold by the owners of the present invention, includes a central passage through the truck body that permits a flow of air along the length of the truck and side ducts along each side wall of the truck body. The side walls are perforated to permit air to enter the side ducts, thereby creating a transverse and horizontal flow of air through the hatchling containers. This design is particularly effective for transporting small numbers of hatchlings, as life sustaining conditions may be maintained for the hatchlings in all of the stacked containers, irregardless of the height position of a container within a stack. However, upon scale-up of this truck body design to a high capacity trailer for accommodating large numbers of hatchlings, significant problems arise in uniformly distributing the transverse and horizontal flow of air so that a similar transverse flow of air is provided at all positions along the length of the trailer. This in turn causes a disparity in environmental conditions from one end of the trailer to the other, which leads to unacceptably high mortality of hatchlings during transport.

Various types of trailers have been designed for transporting large numbers of poultry hatchlings. Most of these trailers have floor ducts that are used to provide a vertical air flow upwardly through the stacked containers, which is then collected in a space adjacent the ceiling of the trailer and is subsequently exhausted from and/or re-circulated within the trailer. The upward air flow is undesirable in that the hatchlings in the poultry containers at the top of a stack are subjected to a flow of air containing impurities derived from the excretions of the hatchlings below. Also, the air delivered to the hatchlings at the top of a stack has a higher temperature than the air delivered to the bottom of the stack. This undesirable vertical air flow leads to unacceptably high mortality of hatchlings. In addition, transverse partitions are typically provided between adjacent stacks along the length of the trailer to aid in distribution of the air flow. These partitions take up space, decreasing the number of containers that may be loaded on to a trailer. The partitions also make loading and un-loading the trailer more difficult and time consuming, which causes an increase in chick mortality since environmental conditions are not controlled during the loading and un-loading process.

An example of a prior art trailer is provided in U.S. Pat. No. 6,581,544, filed Oct. 24, 2001 by Rocky L. Smith and issued Jun. 24, 2003. The trailer has floor ducts connected to the air inlet for delivering air along the length of the trailer. The floor ducts are tapered so that their cross-section decreases towards the rear of trailer to aid in distributing the air along the length of the trailer. Each floor duct has a top with holes therethrough to create an undesirable vertical air flow through the hatchling containers.

An example of a prior art truck is provided in U.S. Pat. No. 4,454,837, filed Nov. 12, 1982, by Ralph C. Luebke and issued Jun. 19, 1984. The truck has floor ducts that are connected to vertical ducts spaced apart along the length and width of the trailer. Each vertical duct is adjacent a stack of hatchling containers and the vertical ducts each have sides with holes therethrough to distribute air along the height of the stack. The spacing between the holes decreases with increasing height along the vertical duct. A truck is disclosed for transporting small numbers of chicks, not a trailer, and the truck has the aforementioned undesirable vertical flow of air through the hatching containers.

An example of another prior art truck is provided in U.S. Pat. No. 1,520,504, filed Jun. 15, 1922, by Frank X. Mudd and issued Dec. 23, 1924. A central passage is provided along the length of the truck for creating a transverse flow of air through hatching containers when the truck is in motion. The air is introduced through vents in the front of the truck and exhausted to the outside through vents in the side of the truck. A truck is disclosed for transporting small numbers of chicks, not a trailer, and no side ducts are disclosed.

However, the need still exists for a large capacity hatchling transport trailer having a transverse flow of air that is well distributed along the length of the trailer.

SUMMARY OF THE INVENTION

According to an aspect of the present invention, there is provided a trailer for transporting live poultry hatchlings comprising: a cargo space comprising a front, a rear, a floor, a ceiling, and two side walls, the cargo space for containing a plurality of perforated hatchling containers stacked to create a central passage along a length of the trailer; a blower means at the front of the trailer for blowing air along the length of the trailer through the central passage; a side duct along each side wall, each side duct permitting a flow of air along the length of the trailer through a cross-sectional area of the side duct; and, each side wall having apertures therein spaced apart along the length of the trailer for admitting air into the side duct from the central passage, thereby creating a transverse flow of air through the hatchling containers, the transverse flow of air being similar at all positions along the length of the trailer.

According to another aspect of the invention, there is provided a method for transporting live poultry hatchlings in a trailer comprising: providing a plurality of perforated containers for housing the hatchlings; stacking the plurality of containers within a cargo space of the trailer and forming an open central passage along a length of the trailer with the stacked containers; introducing air into the central passage and collecting the air in a side duct on each side of the trailer, thereby creating a transverse flow of air through the stacked containers; and, distributing the air so that a similar transverse flow of air is provided at all points along the length of the trailer.

According to yet another aspect of the invention, there is provided a method for ventilating a cargo space of a trailer for transporting live poultry hatchlings, the method comprising the steps of: admitting a flow of air into the cargo space, the cargo space having a first end, a second end, a ceiling, a floor, and two side walls; directing the flow of air from the first end to the second end of the cargo space through a passage in the cargo space; splitting the flow of air into a plurality of transverse air flows that flow through hatching containers in the cargo space, the plurality of transverse air flows being similar at all positions along the length of the trailer; and, admitting the plurality of transverse air flows into a side duct along a side wall of the cargo space.

A trailer according to the present invention has a cargo space for transporting a plurality of hatchling containers. The hatching containers are stacked so as to create a passage, preferably a central passage, along the length of the trailer. A flow of air created by a blower or a plurality of blowers located at the front of the trailer is directed along the length of the trailer through the passage. A fan or plurality of fans may be placed within the passage and/or attached to the ceiling above the passage to boost the flow of air along the passage.

A side duct is provided along one or both side walls for collecting the air from the passage. Each side duct has a side wall, preferably with a plurality of apertures therethrough spaced apart along a length of the trailer for admitting the air into the side duct. This creates a transverse flow of air through the hatchling containers from the passage to the side duct or ducts. The apertures may be located in discrete bands that are vertically spaced apart on the side wall. Between two and five bands, typically three bands, may be provided. The apertures need not necessarily be located in discrete bands and could alternatively be located in any suitable location on the side wall.

A variety of measures may be taken alone or in combination to improve the distribution of air along the length of the trailer. For example, the cross-sectional area of the cargo space may be reduced towards one end of the trailer; the size of the apertures and/or spacing between apertures may be adjusted along the length of the trailer; or, the cross-sectional area of the side duct may be reduced towards one end of the trailer. The overall objective of these measures is to create a transverse flow of air through the hatching containers that is substantially uniform along the length of the trailer.

The cross-sectional area of the cargo space may be reduced by tapering the ceiling downwardly towards one end of the trailer, preferably the rear of the trailer. The height of the ceiling may alternatively be reduced in discrete steps towards one end of the trailer. The roofline of the trailer may be tapered or stepped. Alternatively, the roofline may be of continuous height and an interior ceiling may be provided within the cargo space that is tapered or stepped. Similarly, the floor may be tapered or stepped upwardly towards one end of the trailer, preferably the rear of the trailer. An upward taper may provide the added benefit of creating a slope towards the front of the trailer, easing the loading of wheeled platforms bearing the stacked containers from the rear of the truck and the unloading of the platforms from the front of the truck via a side door. The wheeled platforms may be designed to seal against adjacent platforms and be closely fitted to the side wall so that the platforms create a false floor surface within the trailer. The height of the platforms may increase along the length of the trailer, thereby creating a stepped false floor surface.

The apertures may be varied in size along the length of the trailer. For example, the apertures may increase in size towards the rear of the trailer. The apertures may increase in size uniformly or may be located in discrete regions of increasing size along the length of the trailer. Similarly, the spacing between adjacent apertures may be varied along the length of the trailer. For example, the spacing between adjacent apertures may decrease along the length of the trailer. The spacing may be varied uniformly along the length of the trailer or the apertures may be located in discrete regions, each region having a different spacing between adjacent apertures as compared with an adjacent region. The apertures may be of any suitable shape; for example, the apertures may be circular, oval, oblate, or polygonal. The size of the aperture generally refers to the open area of the aperture, so that increasing the size of the aperture generally decreases the resistance to air flow through the aperture. Generally, the size and spacing of the apertures are varied so that the resistance to air flow through the side walls decreases along the length of the trailer in the direction of air flow along the passage.

The cross-sectional area of the side duct may be varied along the length of the trailer. For example, the cross-sectional area of the side duct may decrease towards the rear of the trailer. This change in cross-sectional area may be achieved by creating discrete steps in the side duct along the outside wall of the side duct. For example, the discrete steps may be provided by varying the thickness of an insulating material that is provided along the outside wall of the side duct. Alternatively, the outside wall or the insulating material may be tapered, for example inwardly tapered towards the rear of the trailer. The cross-sectional area of the side duct may also be decreased by reducing the height of the side duct, for example by tapering the ceiling or floor of the side duct. In any of the foregoing configurations, the side wall may be parallel with the length of the trailer or tapered. When the side wall is tapered, care should be taken not to create gaps between the stacked hatchling containers and the side wall that could permit a flow of air along the side wall rather than through the side duct.

A method of transporting live poultry hatchlings in a trailer may be performed by first providing a plurality of perforated containers for housing the hatchlings and loading the hatchlings into the containers. The containers are then stacked within a cargo space of the trailer, preferably on platforms as previously described, in a manner that forms an open passage along the length of the trailer, preferably a central passage. Next, air is introduced into the passage, preferably by a blower or blowers located at the front of the trailer. The air is then collected in a side duct on one or both sides of the trailer, thereby creating a transverse flow of air through the stacked hatchling containers that is distributed uniformly along the length of the trailer so that a similar transverse flow of air is provided at all points along the length of the trailer. The air may be distributed by creating a pressure difference between the cargo space and the side ducts.

A method for ventilating a cargo space of a trailer for transporting live poultry hatchlings may be performed by first admitting a flow of air into the cargo space. The cargo space normally has a first end, a second end, a ceiling, a floor, and two side walls. The flow of air is then directed from the first end to the second end of the cargo space through a passage in the cargo space. The passage may be a central passage formed by a plurality of stacked hatchling containers, or may be any other suitably formed passage. Next, the flow of air is split into a plurality of transverse air flows that flow through hatching containers in the cargo space. The plurality of transverse air flows are similar at all positions along the length of the trailer. The plurality of transverse air flows are then admitted into a side duct along a side wall of the cargo space. There may be a side duct along each side wall of the cargo space. The first end of the cargo space may be a front end and the second end of the cargo space may be a rear end, or alternatively, the first end of the cargo space may be a rear end and the second end of the cargo space may be a front end.

BRIEF DESCRIPTION OF THE DRAWINGS

Having summarized the invention, preferred embodiments thereof will now be described with reference to the accompanying drawings, in which:

FIG. 5 is a top view of an embodiment of a trailer according to the present invention showing a tapered side duct;

FIG. 6 is a top view of an embodiment of a trailer according to the present invention showing a stepped side duct;

DETAILED DESCRIPTION

Figure 1:
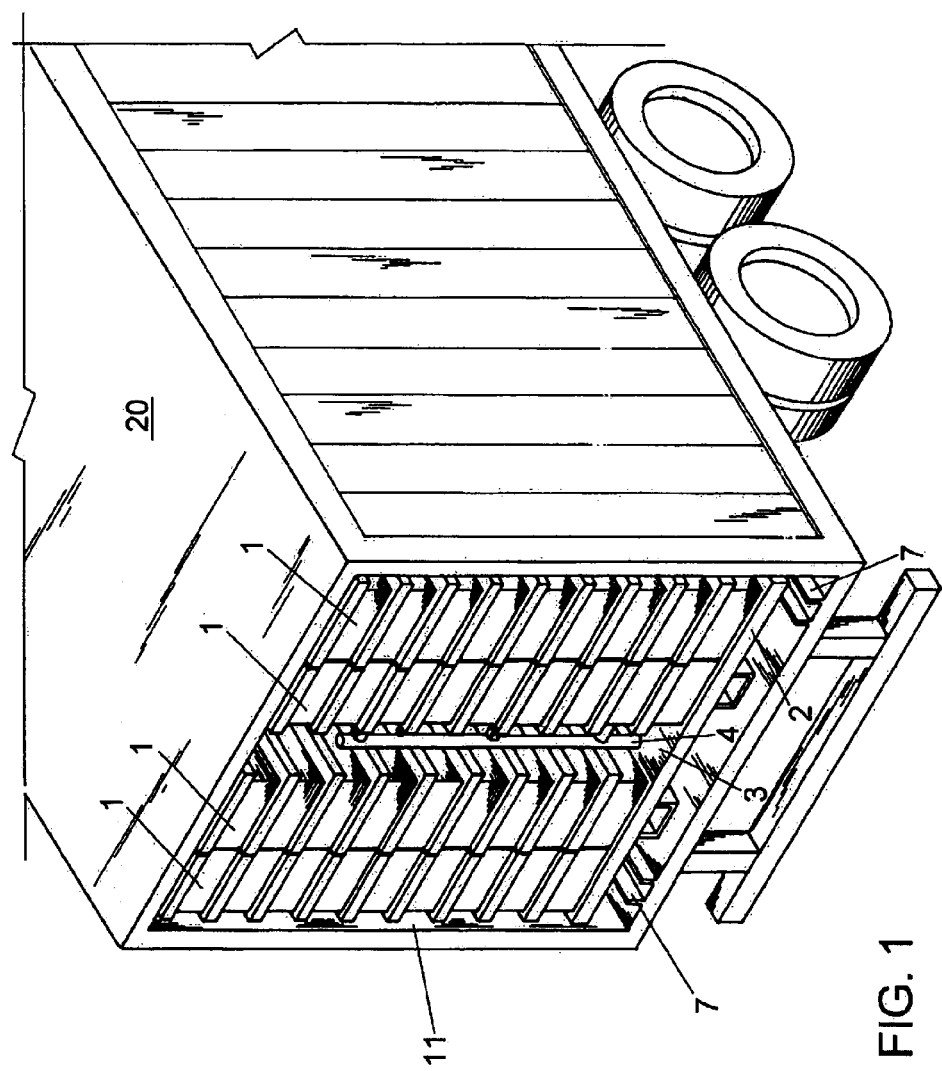
FIG. 1 is a perspective view of a trailer according to the present invention showing features common to all embodiments.

FIGS. 1, 4, 7 and 10 describe certain features that are common to all embodiments of the invention. Referring to FIG. 1, a trailer is shown having a plurality of stacked perforated hatchling containers 1. The containers 1 are stacked on a wheeled platform 2 and arranged so as to create a central passage, generally indicated as 3, along a length of the trailer. A rack 4 may be installed on each platform 2 to aid in the creation of the central passage 3 when stacking the containers 1.

The platforms 2 are typically stacked with containers 1 and loaded into the trailer through a rear door opening using suitable equipment, such as a fork lift. Each platform has a set of wheels (not shown) mounted thereunder and is mobile along the length of the trailer. The wheels on the bottom of each platform 2 fit within a complementary track 7 on the floor of the trailer. The track 7 helps guide the platforms 2 along the length of the trailer as they are loaded through the rear door opening and prevents mis-alignment and binding of the platforms. Each platform 2 has a continuous, non-perforated upper surface that prevents the passage of air flow through the platform. Each platform 2 abuts and seals against an adjacent platform along the length of the trailer and the width of each platform is such that a very small gap exists between the side wall of the trailer 11 and the side edge of the platform. This creates a continuous false floor surface within the cargo space when the trailer is fully loaded with platforms 2. The false floor surface serves to reduce the overall volume of the cargo space so that less blower capacity is needed to create the desired air flow through the trailer. The roofline 20 of the trailer is also shown.

Figure 2:
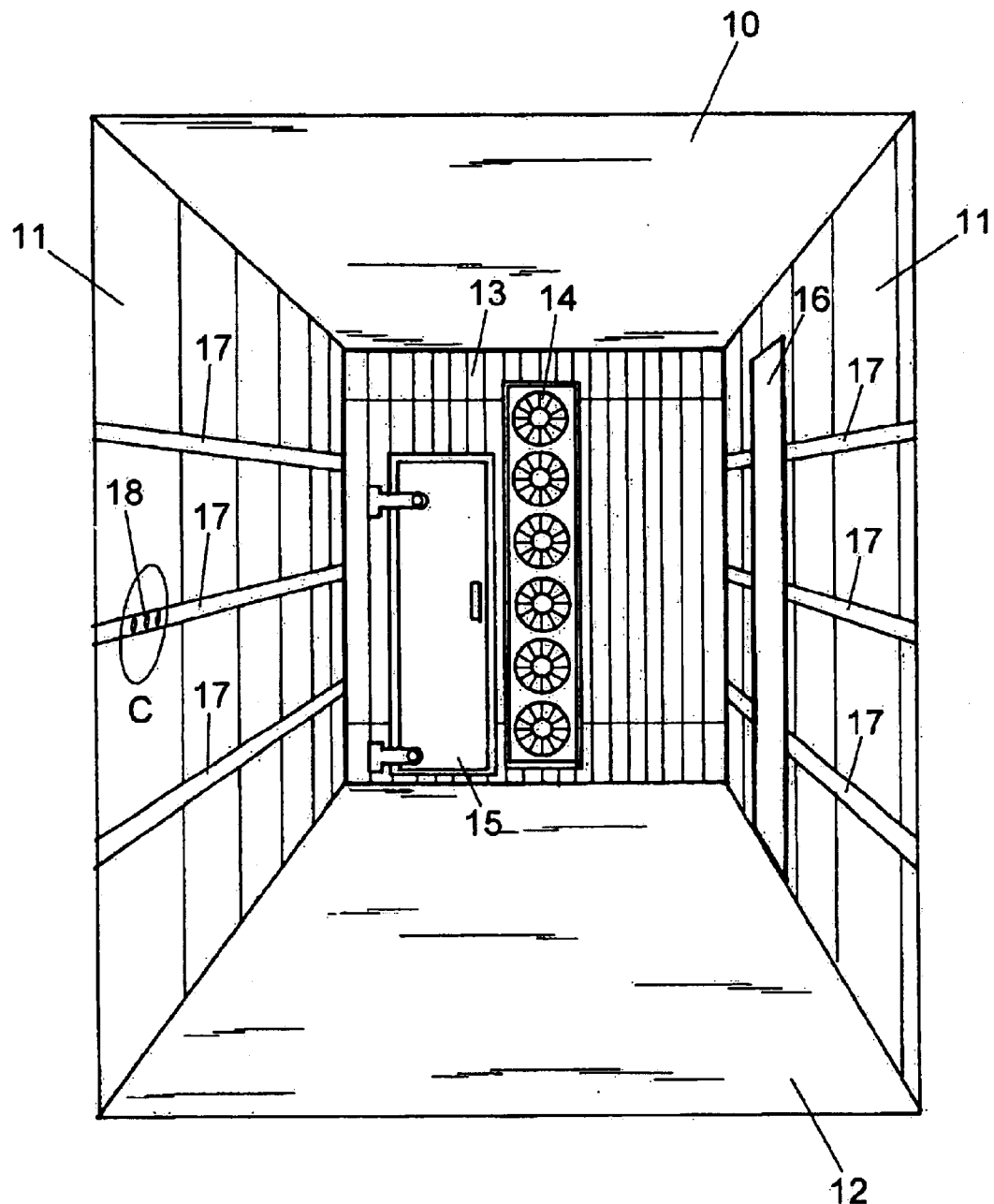
FIG. 2 is a perspective view of the trailer of FIG. 1 showing the interior of the trailer.

FIG. 2 shows the interior of a trailer according to the present invention. A cargo space is generally defined by a ceiling 10, side walls 11, a floor 12, a front wall 13, and a rear door (not shown). A plurality of blowers 14 are located on the front wall 13 in the center of the cargo space. The blowers 14 correspond in location to the central passage formed when the hatchling containers (not shown) are stacked within the cargo space. An access door 15 is provided in the front wall 13 that permits entry to a control room (not shown) located opposite the front wall. The control room contains, inter alia, electrical systems, control systems, and heating and ventilation equipment used to maintain the desired environmental conditions within the cargo space. A side door 16 is typically used for unloading the platforms (not shown) bearing the stacked hatchling containers. A plurality of discrete bands 17 vertically spaced apart from one another are provided on each side wall 11. Each band has along its length a plurality of apertures 18, illustrated generically within circle C, for admitting air through each side wall 11 into an adjacent side duct (not shown). This creates a transverse and horizontal flow of air through the hatchling containers.

Figure 3:
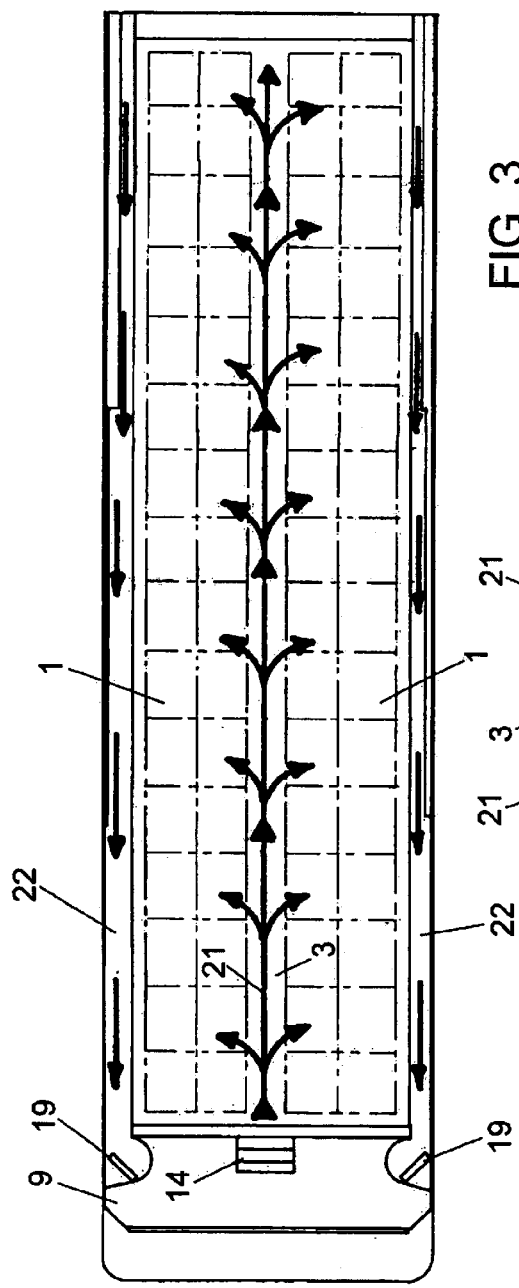
FIG. 3 is a top view of the trailer of FIG. 1 schematically showing the flow of air through the trailer.
Figure 4:
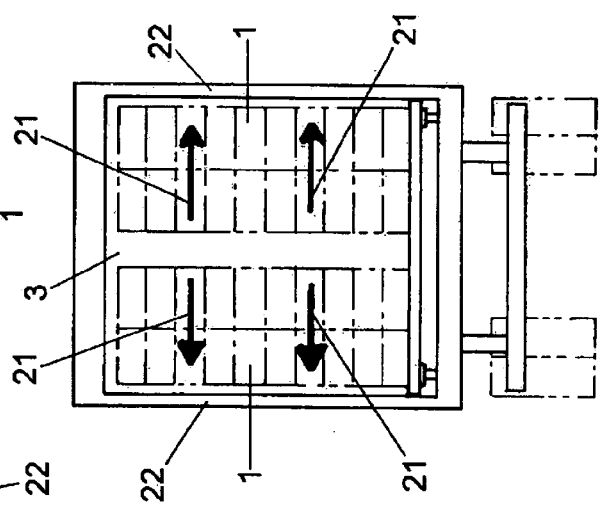
FIG. 4 is a rear view of the trailer of FIG. 1 schematically showing the flow of air through the trailer.

Turning to FIGS. 3 and 4, a transverse flow of air 21 is shown schematically. The flow of air 21 is produced by blowers 14 and flows along the length of the trailer through the central passage 3. The air then flows transversely through the stacked hatchling containers 1 and is admitted into the side ducts 22 through apertures (not shown) in each side wall 11. The transverse flow of air 21 is preferably uniformly distributed along the length of the trailer so that the magnitude of the transverse flow of air is substantially similar at all positions along the length of the trailer. This means that the transverse flow of air 21 at the rear of the trailer is similar to the transverse flow of air at the front of the trailer. In this manner, the desired environmental conditions for promoting life sustaining conditions can be achieved at all positions along the length of the trailer. The transverse flow of air 21 is also preferably similarly distributed across the height of the trailer, as illustrated schematically in FIG. 4. A positive air pressure is typically maintained in the cargo space using the blowers 14 and the air within the side ducts 22 typically has a lower pressure than the air within the cargo space at any position along the length of the trailer. The difference in pressure between the cargo space and the side duct is preferably similar at all positions along the length of the trailer.

FIG. 3 also shows a control room 9 with blowers 14 and ventilation fans 19. The ventilation fans 19 are used to exhaust a certain quantity of air from the trailer through side vents (not shown). A desired percentage of the air from the side ducts 22 may be recycled into the cargo space through the control room 9 in order to maintain the desired environmental conditions within the cargo space. Each side duct 22 may also be equipped with a transfer fan (not shown) to aid in promoting a flow of air along the side duct.

As previously described, a variety of measures may be taken alone or in combination to increase the uniformity of air distribution along the length of the trailer. Various embodiments of these measures are described in FIGS. 5–11.

FIGS. 5 and 6 show two embodiments of one of those measures, namely a decrease in the cross-sectional area of the side duct towards the rear of the trailer. In FIG. 5, a side duct 122 is shown with a plurality of discrete steps 123 along the length of the side duct 122 that decrease the width of the side duct, thereby also decreasing its cross-sectional area. The steps 123 are formed in this embodiment by varying the thickness of insulation provided against the outer wall 124 of the trailer, although other means of forming the steps may also be used. Turning to FIG. 6, a decrease in the cross-sectional area of a side duct 222 is achieved by providing a taper 233 along the length of the side duct adjacent the outer wall 224. The taper in this embodiment is formed from the insulation against the outer wall 224. The taper may be of continuous slope or of differing slopes in discrete sections.

Figure 7:
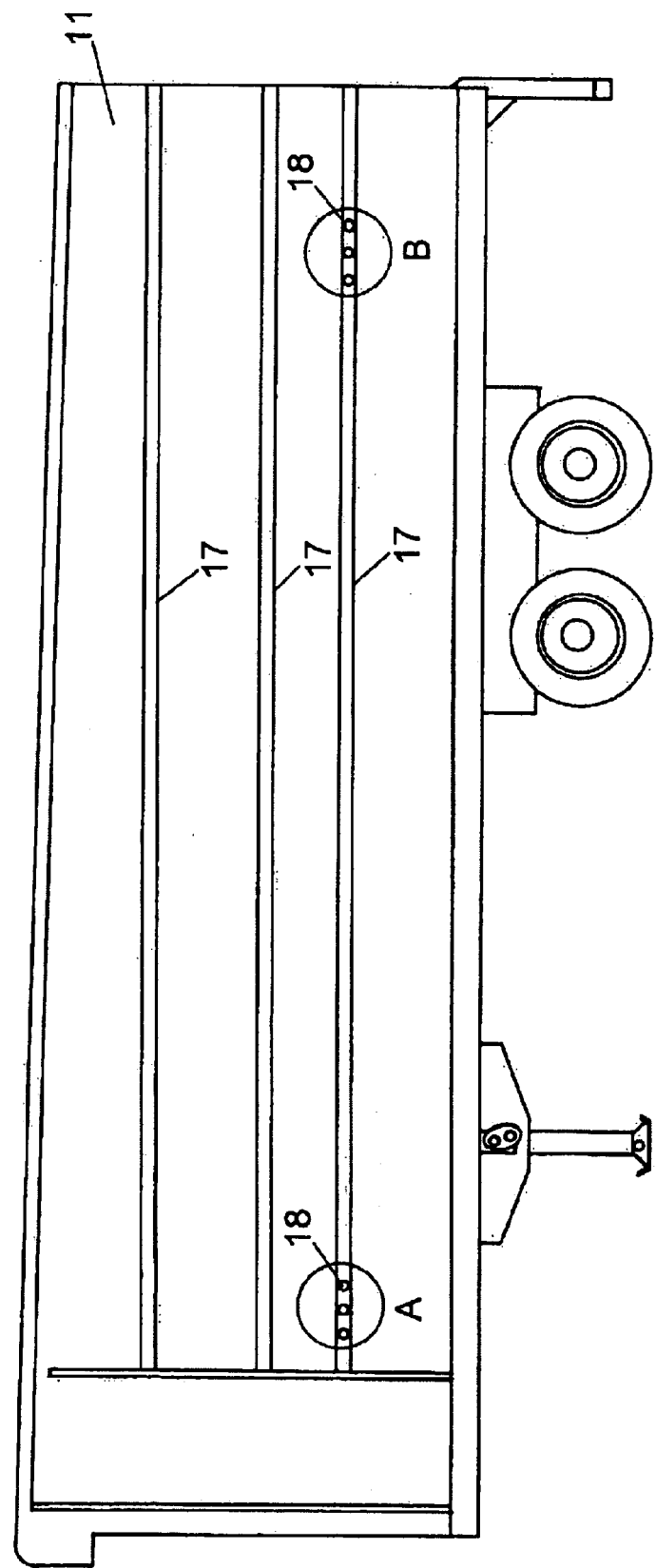
FIG. 7 is a side view of the trailer of FIG. 1 showing bands of apertures in a side wall of the trailer.

FIG. 7 shows a trailer having features common to all embodiments, including a side wall 11 with apertures 18 therethrough located in discrete bands 17 along the side wall. The apertures at the front of the trailer are shown within circle A, while the apertures at the rear of the trailer are shown within circle B. FIG. 7 will be used as a reference in describing the location of apertures referred to in the embodiments described in FIGS. 8 and 9.

Figure 8B:
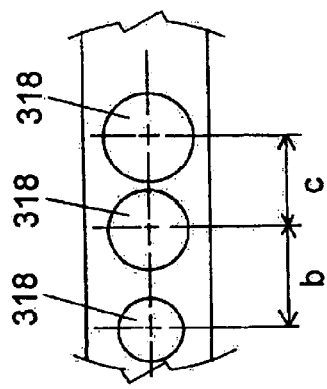
FIG. 8b is a side view of the embodiment of FIG. 8a showing apertures at a position towards the rear of the trailer.
Figure 8A:
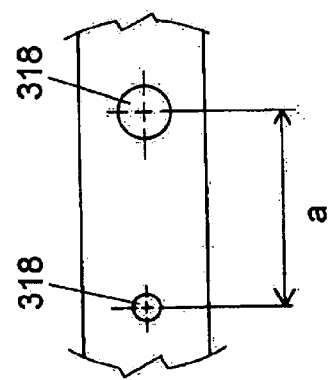
FIG. 8a is a side view of an embodiment of a trailer according to the present invention showing apertures at a position towards the front of the trailer.

FIGS. 8–9 show two embodiments of another of the measures used to increase the uniformity of air distribution, namely varying the size of apertures in the side wall and/or spacing between adjacent apertures. FIGS. 8a and 8b correspond respectively to the circles A and B on FIG. 7 and show one embodiment of apertures according to the present invention. By comparing the size of the apertures 318 shown in FIGS. 8a and 8b, it can be seen that the apertures increase in size towards the rear of the trailer. The spacing between adjacent apertures 318, denoted by dimensions a, b, c, decreases towards the rear of the trailer. Stated mathematically, a>b>c. Therefore, the apertures increase in size and decrease in spacing continuously along the length of the trailer.

Figure 9B:
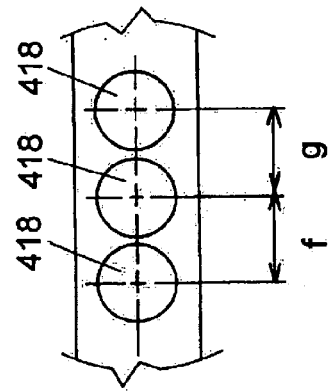
FIG. 9b is a side view of the embodiment of FIG. 9a showing apertures at a position towards the rear of the trailer.
Figure 9A:
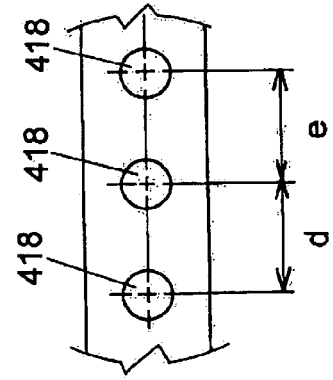
FIG. 9a is a side view of an embodiment of a trailer according to the present invention showing apertures at a position towards the front of the trailer.

FIGS. 9a and 9b correspond respectively to the circles A and B on FIG. 7 and show another embodiment of apertures according to the present invention. By comparing the size of the apertures 418 shown in FIGS. 9a and 9b, it can be seen that apertures 418 of similar size are located in discrete regions along the length of the trailer, the size of the apertures in each region increasing towards the rear of the trailer. The spacing between the apertures 418, denoted by dimensions d, e and f, g, is consistent within a region, but decreases towards the rear of the trailer. Stated mathematically, d=e and f=g, but (d,e)>(f,g). Therefore, the apertures increase in size and decrease in spacing in discrete regions along the length of the trailer.

Other possible embodiments include combinations wherein aperture size increases towards the rear of the trailer while maintaining constant aperture spacing, or wherein aperture spacing decreases towards the rear of the trailer while maintaining constant aperture size. Similarly, the apertures may increase in size continuously and decrease in spacing in discrete regions, or increase in size in discrete regions and decrease in spacing continuously. Any desired combination of aperture size and spacing may be selected to achieve the desired uniformity in the transverse flow of air at all positions along the length of the trailer.

Figure 10:
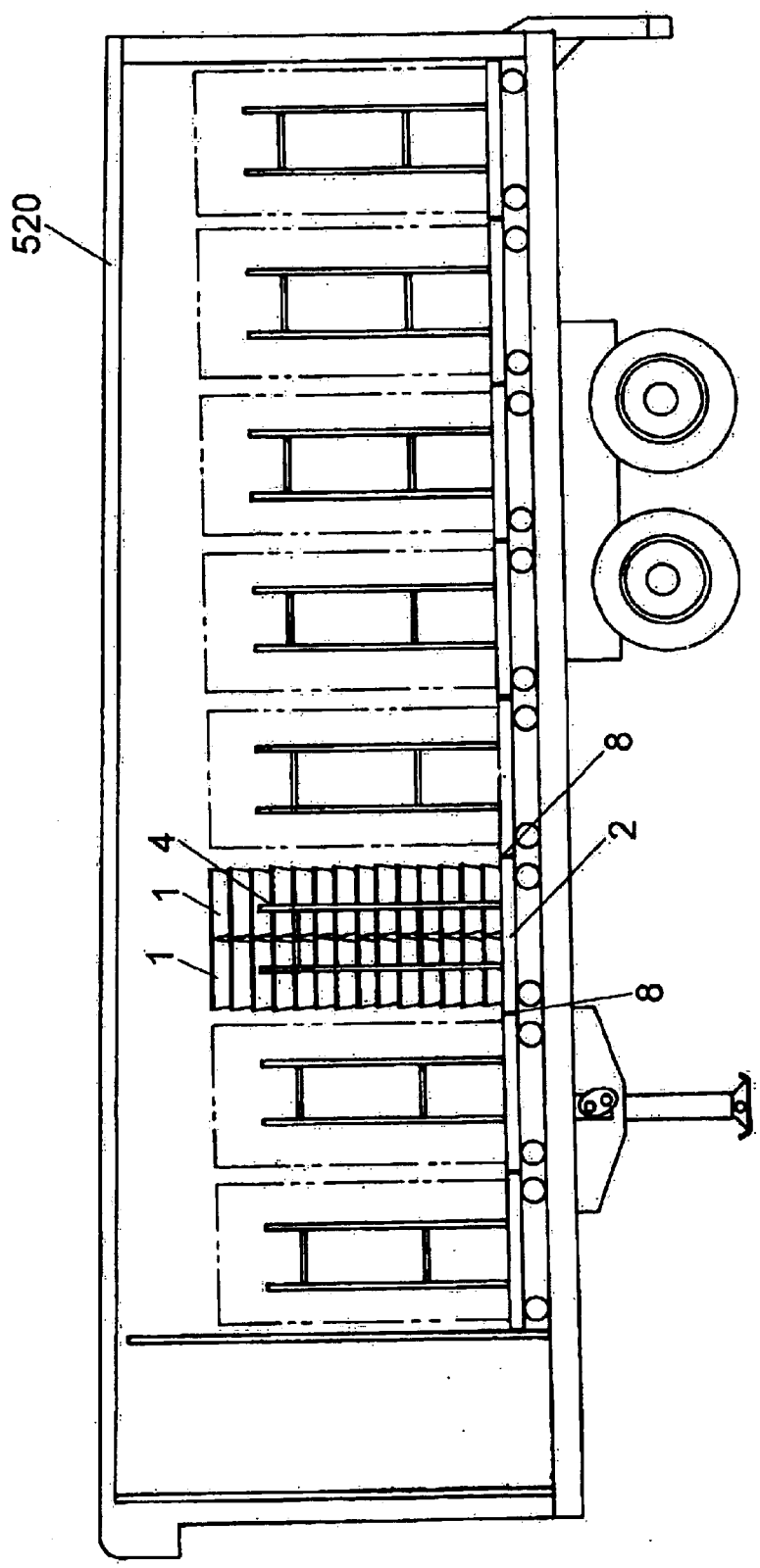
FIG. 10 is a side view of an embodiment of a trailer according to the present invention having a tapered roofline, also showing certain features common to all embodiments; and, FIG. 11 is a side view of an embodiment of a trailer according to the present invention having a tapered interior ceiling.
Figure 11:
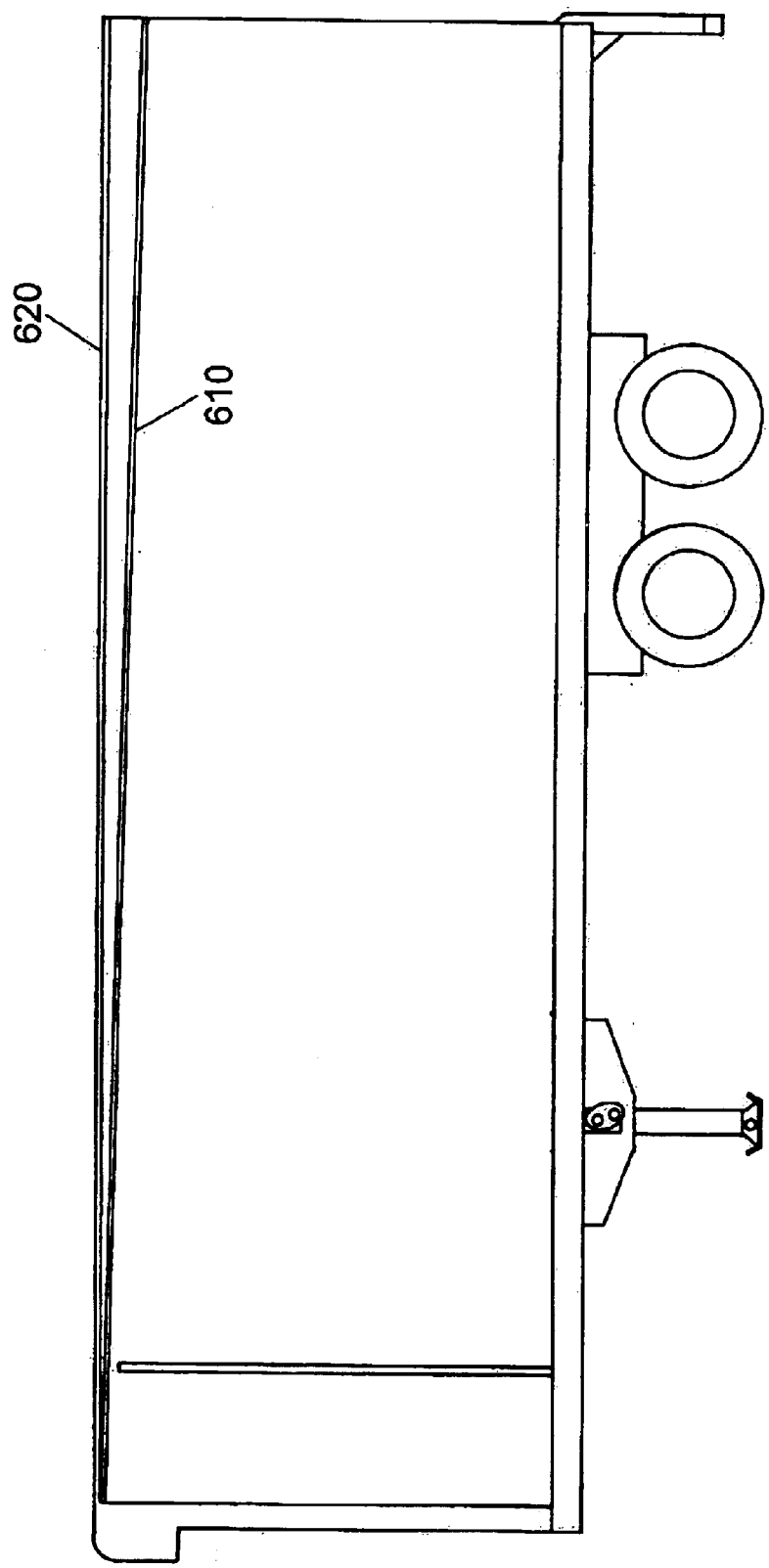

FIGS. 10 and 11 show two embodiments of another of the measures used to distribute the transverse flow of air, namely a decrease in the volume of the cargo space towards the rear of the trailer. FIG. 10 shows an embodiment of a trailer having a tapered roofline 520. The roofline 520 slopes downwardly towards the rear of the trailer, thereby decreasing the cross-sectional area of the interior cargo space. In this embodiment, the cross-sectional area of the side ducts (not shown) may also decrease due to the decreasing height of the side ducts.

FIG. 11 shows another embodiment of a trailer having a downwardly tapered interior ceiling 610 within the cargo space of the trailer. The roofline 620 of the trailer is of constant height at all positions along the length of the trailer. The interior ceiling 610 may extend fully across the width of the trailer, including the side ducts (not shown), or may be provided only within the cargo space so that the height of the side ducts remains constant at all positions along the length of the trailer. The interior ceiling 610 may alternatively be downwardly stepped towards the rear of the trailer to achieve the desired decrease in cross-sectional area of the cargo space.

Returning to FIG. 10, certain features common to all embodiments are shown. Hatchling containers 1 are shown stacked upon platforms 2 with racks 4 installed on each platform to aid in the creation of a central passage (not shown). Each platform 2 abuts and seals against an adjacent platform along the length of the trailer using seal 8, which may be of any suitable design that prevents air flow vertically between the platforms. The stacked hatchling containers 1 are generally closely packed to reduce the likelihood of creating a transverse channel between adjacent stacks that could lead to a short-circuiting of the air flow through the hatchling containers. Although generally not required, blocking members (not shown) may be inserted between adjacent stacks of containers 1 to block any transverse channels that are inadvertently created.

Any of the foregoing features may be provided alone or in combination to produce a transverse flow of air that is uniform along the length of the trailer. In a preferred embodiment, the trailer has a side duct along each side wall that is inwardly stepped towards the rear of the trailer by means of varying the thickness of insulation against the outer wall of the trailer. The side walls and outer walls are parallel along the length of the trailer. The roofline of the trailer is downwardly tapered towards the rear of the trailer. This reduces the cross-sectional area of the cargo space and the side ducts towards the rear of the trailer. A plurality of apertures are located in three discrete bands that are vertically spaced apart on each side wall. The spacing between the apertures decreases towards the rear of the trailer. The apertures are generally circular and the diameter of the apertures increases towards the rear of the trailer. A plurality of platforms is provided, each platform substantially equal in width to the width of the cargo space and having sealing means for sealing against adjacent platforms along the length of the trailer. This creates a false floor surface within the cargo space having a consistent height along the length of the trailer. The platforms are non-perforated. A plurality of hatchling containers are stacked on each platform in a manner that creates a central passage along the length of the trailer. There is one stack on each side of the passage and each stack comprises four hatchling containers in horizontal cross-section. Air is introduced into the central passage by a plurality of blowers located at the front of the trailer. The air then flows from the central passage to the side ducts through the hatchling containers, thereby creating a transverse flow of air. The transverse flow of air is similar at all positions along the length of the trailer. A portion of the air is exhausted from the trailer and a portion of the air is re-circulated. The air entering the cargo space is conditioned in order to create the desired life sustaining conditions within the cargo space.

A person skilled in the art will recognize that variants or mechanical equivalents may be substituted for certain of the previously described features without having an effect on the way in which the invention works.

Having described the invention, what is claimed is:

1. A trailer for transporting live poultry hatchlings comprising:
   a) a cargo space comprising a front, a rear, a floor, a ceiling, and two side walls, the cargo space for containing a plurality of perforated hatching containers stacked to create a central passage along a length of the trailer;
   b) a means for blowing at the front of the trailer for blowing air along the length of the trailer through the central passage;
   c) a side duct along each side wall, each side duct permitting a flow of air along the length of the trailer through a cross-sectional area of the side duct; and,
   d) each side wall having apertures therein spaced apart along the length of the trailer for admitting air into the side duct from the central passage, thereby creating a transverse flow of air through the hatchling containers, the transverse flow of air being similar at all positions along the length of the trailer.

2. The trailer of claim 1, wherein the cross-sectional area of the side duct decreases towards the rear of the trailer.

3. The trailer of claim 1, wherein the cross-sectional area of the side duct decreases in discrete steps towards the rear of the trailer.

4. The trailer of claim 1, wherein the cargo space has a cross-sectional area that decreases towards the rear of the trailer.

5. The trailer of claim 1, wherein the ceiling is downwardly tapered towards the rear of the trailer.

6. The trailer of claim 1, wherein the apertures increase in size towards the rear of the trailer.

7. The trailer of claim 1, wherein the spacing between adjacent apertures decreases towards the rear of the trailer.

8. The trailer of claim 3, wherein the ceiling is downwardly tapered towards the rear of the trailer, wherein the apertures increase in size towards the rear of the trailer, and wherein the spacing between adjacent apertures decreases towards the rear of the trailer.

9. The trailer of claim 1, wherein the floor comprises a plurality of carts, each cart mobile along the length of the trailer and comprising a platform with a set of wheels mounted thereunder, the platform for supporting a plurality of stacked hatchling containers, each platform abutting an adjacent platform along the length of the trailer, the platforms creating a continuous surface within the cargo space.

10. The trailer of claim 9, wherein the platforms are non-perforated.

11. A method for transporting live poultry hatchlings in a trailer comprising:
   a) providing a plurality of perforated containers for housing the hatchlings;
   b) stacking the plurality of containers within a cargo space of the trailer and forming an open central passage along a length of the trailer with the stacked containers;
   c) introducing air into the central passage and collecting the air in a side duct on each side of the trailer, thereby creating a transverse flow of air through the stacked containers; and,
   d) distributing the air so that a similar transverse flow of air is provided at all points along the length of the trailer.

12. The method of claim 11, wherein the air is distributed by creating a pressure difference between the cargo space and the side ducts.

13. A method for ventilating a cargo space of a trailer for transporting live poultry hatchlings, the method comprising the steps of:
   a) admitting a flow of air into the cargo space, the cargo space having a first end, a second end, a ceiling, a floor, and two side walls;
   b) directing the flow of air from the first end to the second end of the cargo space through a passage in the cargo space;
   c) splitting the flow of air into a plurality of transverse air flows that flow through hatchling containers in the cargo space, the plurality of transverse air flows being similar at all positions along the length of the trailer; and,
   d) admitting the plurality of transverse air flows into a side duct along a side wall of the cargo space.

14. The method of claim 13, wherein the passage is a central passage and wherein there is a side duct along each side wall.

15. The method of claim 14 wherein the flow of air through the central passage is split into the plurality of transverse air flows by a plurality of spaced apart apertures in the side walls permitting fluid communication between the cargo space and the side ducts.

16. The method of claim 15, wherein the spacing between the apertures in the side walls decreases towards the second end of the cargo space.

17. The method of claim 15, wherein the apertures in the side walls increase in size towards the second end of the cargo space.

18. The method of claim 14, wherein the side ducts have a greater cross-sectional area at the first end of the cargo space than at the second end.

19. The method of claim 14, wherein the cargo space has a greater cross-sectional area at the first end than at the second end.

20. The method of claim 13, wherein the first end is a front end of the trailer and the second end is a rear end of the trailer.

* * * * *